(12) United States Patent
Palmer

(10) Patent No.: US 10,594,187 B2
(45) Date of Patent: Mar. 17, 2020

(54) EPICYCLIC GEARTRAIN

(71) Applicant: ROLLS-ROYCE PLC, London (GB)

(72) Inventor: Chloe J Palmer, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/217,243

(22) Filed: Dec. 12, 2018

(65) Prior Publication Data

US 2019/0214884 A1    Jul. 11, 2019

(30) Foreign Application Priority Data

Jan. 11, 2018  (GB) .................................. 1800412.7

(51) Int. Cl.
| | |
|---|---|
| *F16H 1/28* | (2006.01) |
| *H02K 7/116* | (2006.01) |
| *F02K 3/06* | (2006.01) |
| *F02C 7/36* | (2006.01) |
| *F16H 57/08* | (2006.01) |

(Continued)

(52) U.S. Cl.
CPC ............. *H02K 7/116* (2013.01); *F01D 15/10* (2013.01); *F02C 7/32* (2013.01); *F02C 7/36* (2013.01); *F02K 3/06* (2013.01); *F16H 1/28* (2013.01); *F16H 57/08* (2013.01); *H02K 7/1823* (2013.01); *H02K 21/24* (2013.01); *F05D 2220/768* (2013.01); *F05D 2260/40311* (2013.01); *F16H 2057/02034* (2013.01)

(58) Field of Classification Search
CPC .............. F02C 7/36; H02K 7/116; F16H 1/28
See application file for complete search history.

(56) References Cited

U.S. PATENT DOCUMENTS

| | | | |
|---|---|---|---|
| 8,084,912 B2* | 12/2011 | Mizushima | H02K 7/116 310/179 |
| 8,568,099 B2* | 10/2013 | Sabannavar | G01M 13/028 416/170 R |

(Continued)

FOREIGN PATENT DOCUMENTS

| | | |
|---|---|---|
| CN | 202918118 U | 5/2013 |
| CN | 105889458 A | 8/2016 |

(Continued)

OTHER PUBLICATIONS

Apr. 12, 2019 European Search Report issued in European Application No. 18211626.9.

(Continued)

*Primary Examiner* — Derek D Knight
(74) *Attorney, Agent, or Firm* — Oliff PLC

(57) ABSTRACT

An epicyclic geartrain comprises a sun gear, a plurality of planet gears, and a ring gear. The plurality of planet gears is supported by a planet torque ring. The planet gears meshingly surround the sun gear, and the ring gear meshingly surrounds the planet gears. At least one of the sun gear, the plurality of planet gears, and the ring gear, is provided with a plurality of permanent magnet portions. Each of the plurality of magnet portions is arranged as a circumferential array. The planet torque ring is provided with at least one stator coil array, with the or each stator coil array being positioned in axial alignment with the or each corresponding plurality of permanent magnet portions as an axial flux electric motor generator element.

11 Claims, 5 Drawing Sheets

(51) Int. Cl.
*H02K 7/18* (2006.01)
*F02C 7/32* (2006.01)
*F01D 15/10* (2006.01)
*H02K 21/24* (2006.01)
*F16H 57/02* (2012.01)

(56) References Cited

U.S. PATENT DOCUMENTS

| | | | |
|---|---|---|---|
| 2007/0095583 A1 | 5/2007 | Lee | |
| 2009/0058214 A1* | 3/2009 | Mizushima | H02K 7/116 310/203 |
| 2010/0041504 A1* | 2/2010 | Palmer | F16H 3/72 475/149 |
| 2011/0012453 A1* | 1/2011 | Wilson | H02K 49/106 310/83 |
| 2012/0156034 A1 | 6/2012 | Sabannavar et al. | |

FOREIGN PATENT DOCUMENTS

| | | |
|---|---|---|
| DE | 4417040 C1 | 6/1995 |
| DE | 10 2013 208428 A1 | 11/2013 |
| EP | 1986312 A1 | 10/2008 |
| GB | 1535190 A | 12/1978 |
| JP | 2006-022901 A | 1/2006 |
| WO | 2017/041854 A1 | 3/2017 |

OTHER PUBLICATIONS

May 14, 2019 extended European Search Report in Application No. 18211625.1.

May 30, 2018 Search Report issued in British Patent Application No. 1800412.7.

May 25, 2018 Search Report issued in British Patent Application No. 1800413.5.

* cited by examiner

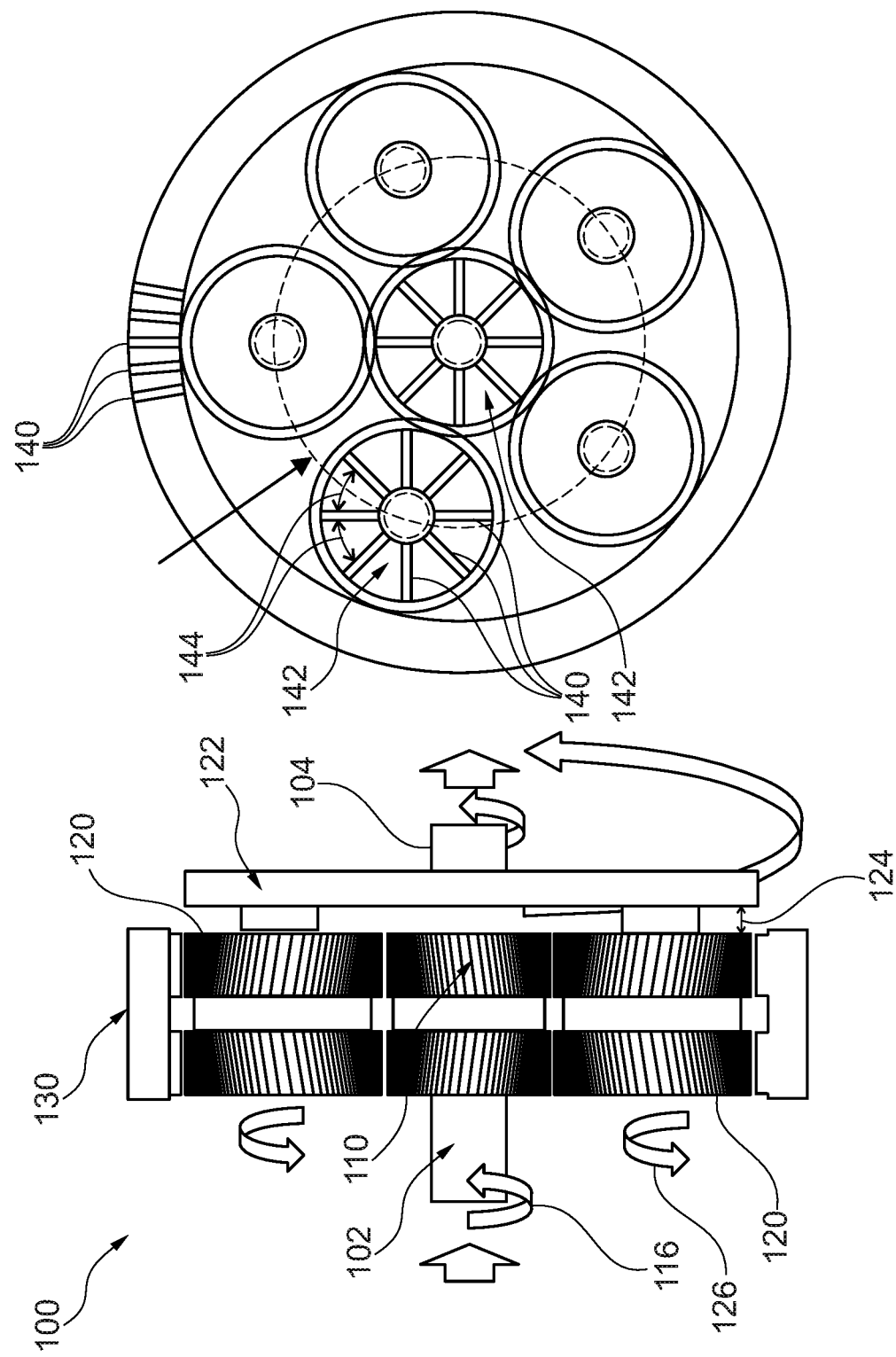

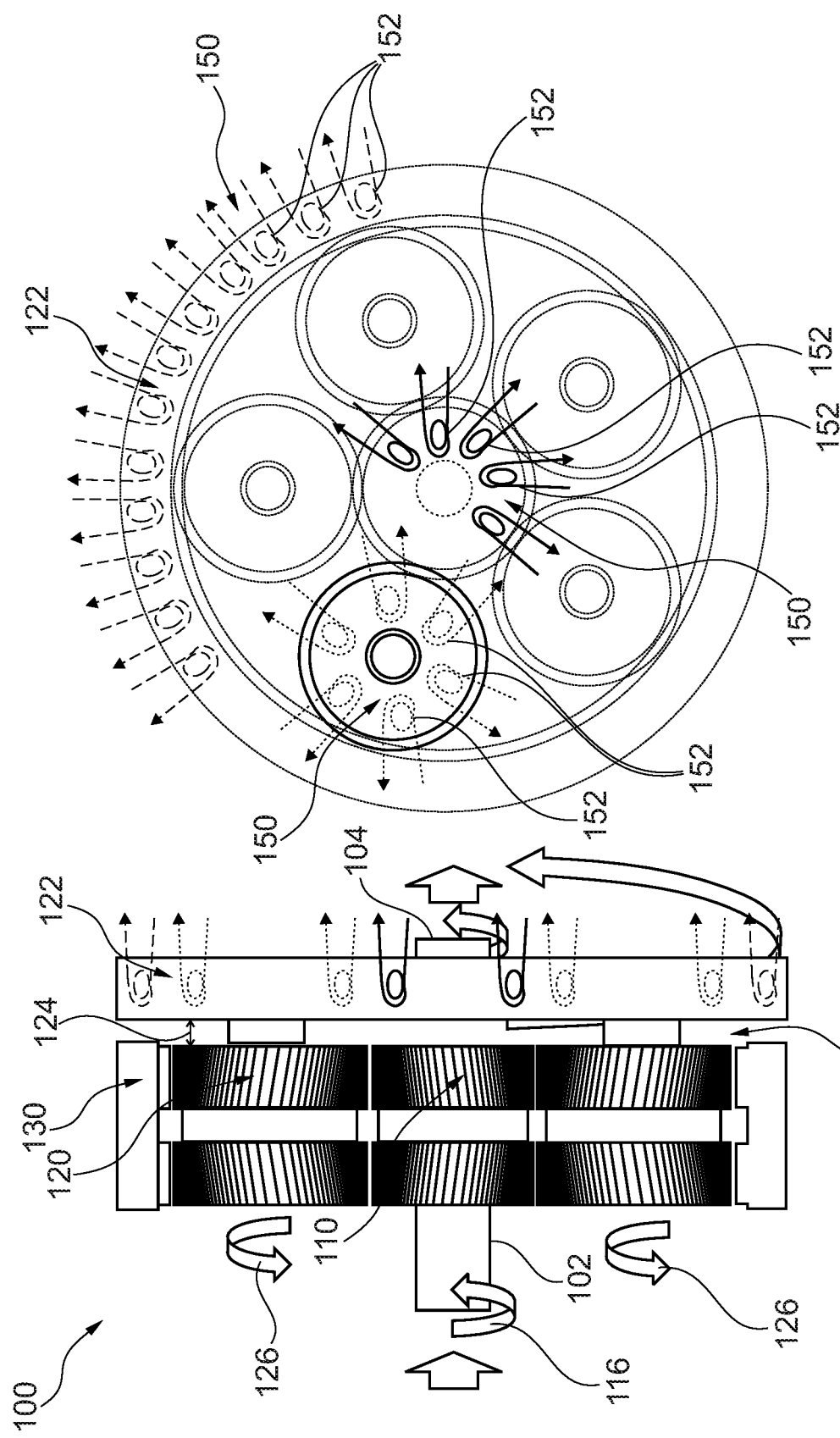

EPICYCLIC GEARTRAIN

This disclosure claims the benefit of UK Patent Application No. GB 1800412.7, filed on 11 Jan. 2018, which is hereby incorporated herein in its entirety.

FIELD OF THE DISCLOSURE

The present disclosure relates to an epicyclic geartrain and particularly, but not exclusively, to an epicyclic geartrain for a geared turbofan.

BACKGROUND TO THE DISCLOSURE

A conventional turbofan engines is require to generate electrical power for ancillary systems both in the engine and the associated installation. Such conventional arrangements utilise an accessory gearbox that takes drive from the turbofan main shaft(s) and drives a separate electrical generator.

FIG. 1 illustrates a two-shaft gas turbine engine 10 having a principal rotational axis 9. The engine 10 comprises an air intake 12 and a propulsive fan 23 that generates two airflows A and B. The gas turbine engine 10 comprises a core engine 11 having, in axial flow A, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner with air in the core airflow A being accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted.

The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 generally provides the majority of the propulsive thrust. The epicyclic gearbox 30 is a reduction gearbox.

A known mechanical arrangement for a geared fan gas turbine engine 10 is shown in FIG. 2. The low pressure turbine 19 drives the shaft 26, which is coupled to a sun wheel, or sun gear, 28 of the epicyclic gear arrangement 30. Radially outwardly of the sun gear 28 and intermeshing therewith, in a conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The epicyclic gearbox 30 is of the planetary type, in that the planet carrier 34 rotates about the sun gear 28 and is coupled to an output shaft via linkages 36. In other applications the gearbox 30 may be a differential gearbox in which the ring gear 38 also rotates in the opposite sense and is coupled to a different output shaft via linkages 40. An epicyclic gearbox 30 must be lubricated, by oil or another fluid. However, the oil becomes heated by being worked during operation of the epicyclic gearbox 30.

A geared turbofan engine utilises a fan reduction gearbox to provide rotational drive to the fan at a lower speed that the gas turbine core engine. The use of a second gearbox (as outlined above) to drive an electrical generator adds weight and complexity.

STATEMENTS OF DISCLOSURE

According to a first aspect of the present disclosure there is provided an epicyclic geartrain comprising:
 a sun gear;
 a plurality of planet gears, the plurality of planet gears supported by a planet torque ring; and
 a ring gear,
 wherein the planet gears meshingly surround the sun gear, and the ring gear meshingly surrounds the planet gears, and at least one of the sun gear, the plurality of planet gears, and the ring gear, is provided with a plurality of permanent magnet portions, the plurality of magnet portions arranged as a circumferential array, and the planet torque ring is provided with at least one stator coil array, the or each stator coil array being positioned in axial alignment with the or each corresponding plurality of permanent magnet portions as an axial flux electric motor generator element.

The incorporation of electric motor generator elements into an epicyclic geartrain enables the generation of electrical power from the relative motion of the epicyclic geartrain elements. The structure of the epicyclic geartrain provides the relative rotation, which means that only the electromagnetic elements are required to be added in order to create an electrical machine. This means that the epicyclic geartrain of the present disclosure is more convenient for a user.

The permanent magnet portions may be positioned in the sun gear, or in the planet gears, or in the ring gear, or in any combination of these geartrain elements. This makes the epicyclic geartrain of the present disclosure flexible.

The use of axial flux electric motor generator elements means that the magnet portions and corresponding stator coil arrays can be incorporated into the existing structural elements of the epicyclic geartrain without increasing an axial length of the epicyclic geartrain. This makes the epicyclic geartrain of the present disclosure more compact and structurally more efficient than the prior art equivalent of adding a separate electric motor generator to a conventional epicyclic gearbox.

Optionally, each of the plurality of planet gears is provided with a plurality of permanent magnet portions, the plurality of magnet portions being arranged as a circumferential array.

The planet gears in an epicyclic geartrain will have the highest rotational speed of any of the geartrain elements. Consequently, adding an electric motor generator element to each of the planet gears will provide increased efficiency to the resulting epicyclic geartrain of the present disclosure over positioning the electric motor generator element(s) in either of the sun gear or the ring gear.

Optionally, the sun gear and each of the plurality of planet gears is provided with a plurality of permanent magnet portions, the plurality of magnet portions being arranged as a circumferential array.

Optionally, the sun gear, each of the plurality of planet gears, and the ring gear, is provided with a plurality of permanent magnet portions, the plurality of magnet portions being arranged as a circumferential array.

Optionally, the plurality of magnet portions is arranged as a spaced circumferential array on the sun gear, and/or on at least one of the planet gears, and/or on the ring gear.

In one arrangement of the disclosure, the plurality of magnet portions is arranged as a circumferentially spaced array around at least one of the sun gear, the planet gears, and the ring gear. This minimises the marginal complexity of incorporating the magnet portions into the epicyclic geartrain elements.

In an alternative arrangement of the disclosure, the plurality of magnet portions is arranged as a continuous circumferential array around at least one of the sun gear, the planet gears, and the ring gear.

Optionally, each one of plurality of magnet portions is attached to an axial face of a corresponding one of the sun gear, plurality of planet gears and ring gear.

Attaching the plurality of magnet portions to an axial face of a corresponding one of the sun gear, plurality of planet gears and ring gear, makes the epicyclic geartrain of the present disclosure simpler and easier to manufacture than integrally incorporating the magnet portions into the corresponding geartrain elements.

Optionally, each stator coil array comprises 'C' individual coil portions, each circumferential array of magnet portions comprises 'M' individual magnet portions, and a ratio of C/M is in the range of 0.2 to 1.0.

Providing a ratio of coil portions (C) to magnet (M) portions of 0.2<C/M<1.0 results in the electrical performance of the electrical machine being optimised.

Optionally, each stator coil array comprises at least six coil portions, the six coil portions being arranged as a circumferential array.

The use of at least six coil portions in each stator coil array allows for the resulting electrical machine to have the characteristics of a four-pole machine. This makes the resulting epicyclic geartrain of the present disclosure more useful and convenient for a user.

According to a second aspect of the present disclosure there is provided a geared turbofan engine comprising:
  a fan;
  a core gas turbine engine; and
  a gearbox,
    wherein the gearbox connects the fan to the core gas turbine engine, and the gearbox comprises an epicyclic geartrain according to the first aspect.

The epicyclic geartrain of the present disclosure enables the resulting geared turbofan engine to generate electrical power when the motor generator elements are in a generator configuration, and also to be rotated for starting purposes when the motor generator elements are in a motor configuration. This results in the geared turbofan engine of the present disclosure having a lower weight and a reduced complexity over an equivalent prior art turbofan engine.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIG. 4 shows schematic cross-sectional and axial views of the epicyclic geartrain of the present disclosure, illustrating the magnet portion placement; and FIG. 5 shows schematic cross-sectional and axial views of the epicyclic geartrain of the present disclosure, illustrating the stator coil portion placement.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
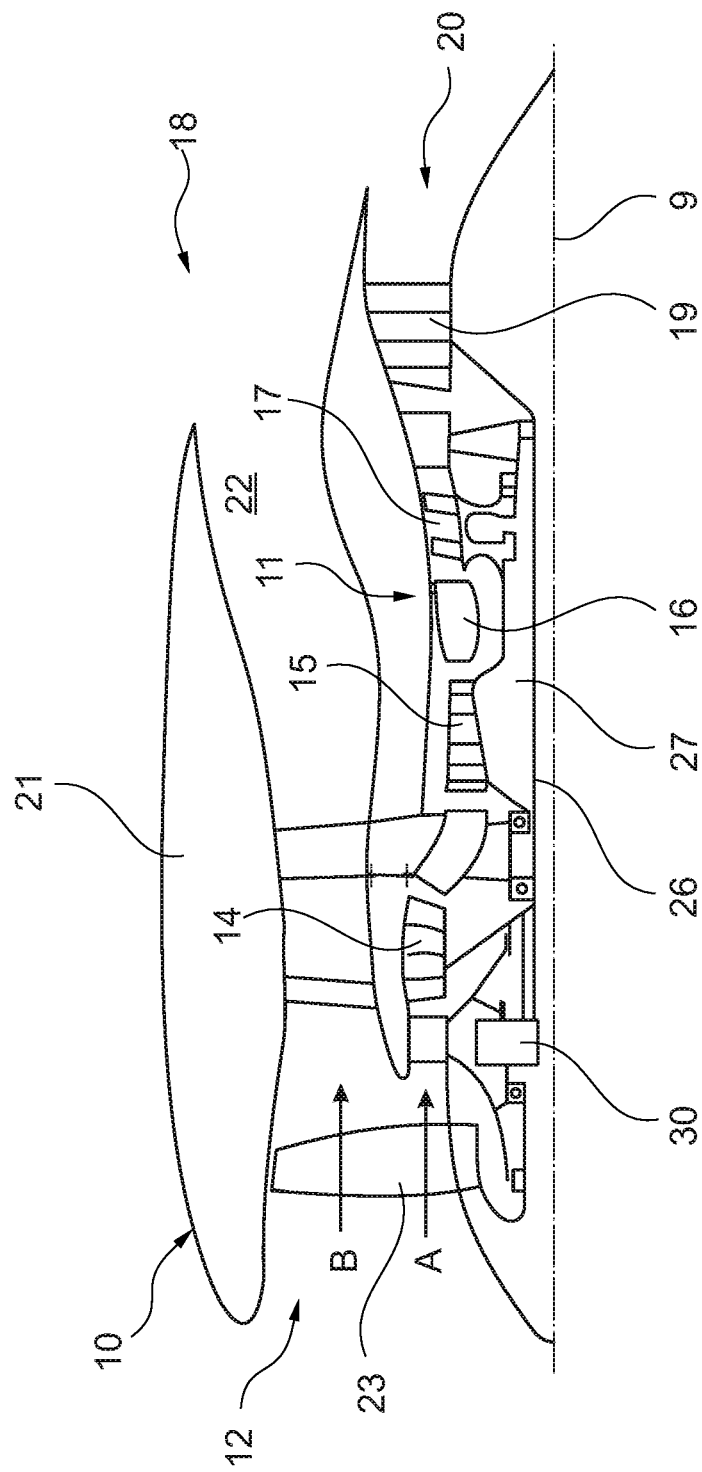
FIG. 1 shows a schematic sectional view of a geared turbofan gas turbine engine incorporating an epicyclic geartrain according to the present disclosure.
Figure 2:
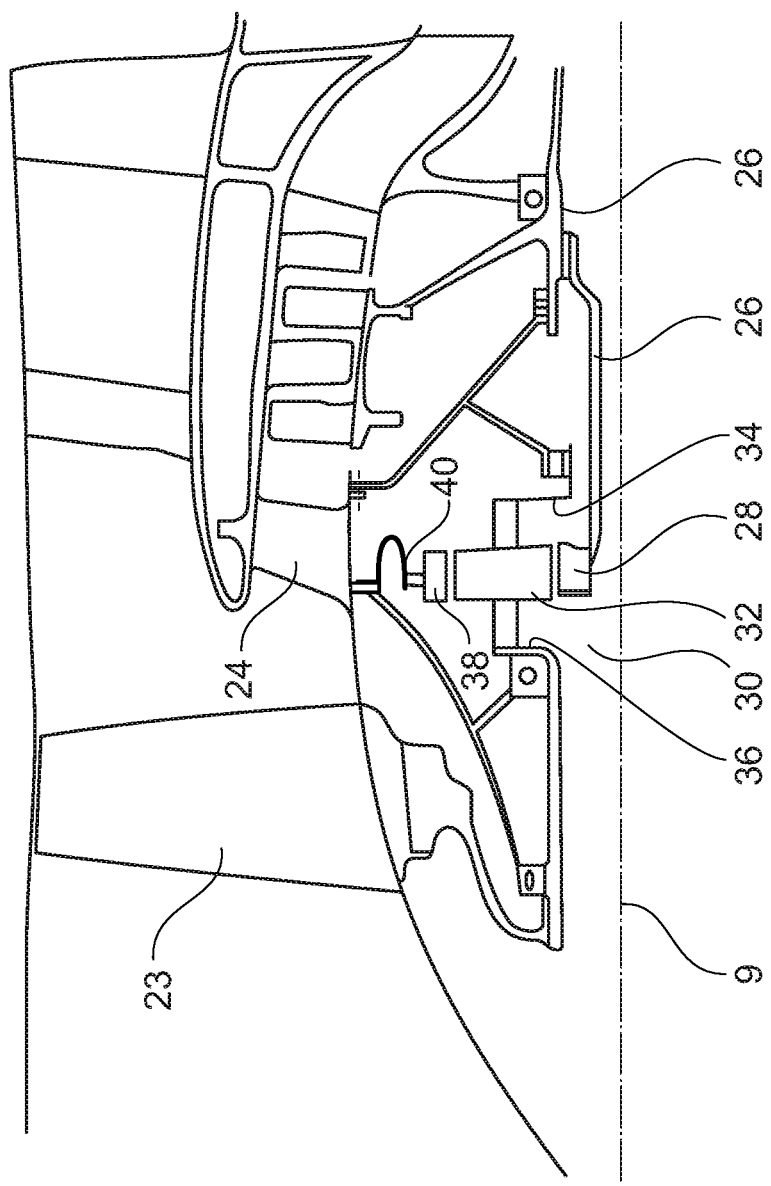
FIG. 2 shows an enlarged schematic view of the gearbox region of the engine of FIG. 1.
Figure 3:
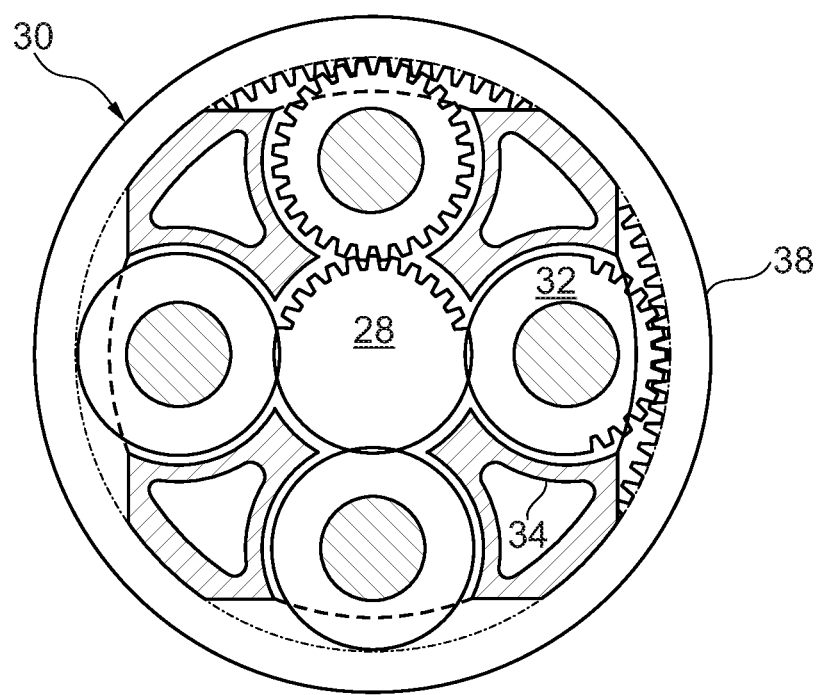
FIG. 3 shows a schematic axial view of the gearbox of the engine of FIG. 1.

A typical arrangement of the epicyclic gearbox 30 used in a geared turbofan gas turbine engine 10 is shown in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

Referring to FIG. 3, an epicyclic geartrain according to an embodiment of the disclosure is designated generally by the reference numeral 100.

As illustrated in FIG. 4, the epicyclic geartrain 100 comprises a sun gear 110, a plurality of planet gears 120, and a ring gear 130. Each of the plurality of planet gears 120 is rotationally attached to a planet torque ring 122. Each of the planet gears 120 is free to rotate relative to the planet torque ring 122.

In the present embodiment, the epicyclic geartrain 100 is configured in a planetary configuration, in which the sun gear 110 rotates in a first direction, and the planet torque ring 122 (together with the plurality of planet gears 120) rotates in a second opposite direction, while the ring gear 130 remains stationary. The epicyclic geartrain 100 of the present disclosure may however equally be applied to epicyclic gearbox configurations of the star or differential form.

The planet torque ring 122 is positioned in an axial plane. The planet torque ring 122 is axially offset from the ring gear 130 by an axial clearance 124.

In the present embodiment the epicyclic geartrain 100 comprises five planet gears 120. As outlined above, other embodiments of the disclosure may comprise an alternative quantity, say four or six for example, of planet gears 120.

Each of the planet gears 120 meshes with the sun gear 120, and the planet gears are positioned to surround the sun gear 110. The ring gear 130 meshes with each of the planet gears 120, and the ring gear 130 is positioned to surround the planet gears 120.

The sun gear 110 and the ring gear 130 are positioned to be coaxial. The planet gears 120 are arranged in a circumferential array around the sun gear 110.

Each of the sun gear 110, the planet gears 120, and the ring gear 130 is provided with a plurality of permanent magnet portions 140. For each of the sun gear 110, the planet gears 120, and the ring gear 130, the plurality of permanent magnet portions 140 are arranged as a circumferential array 142. In other words, each of the sun gear 110, the planet gears 120, and the ring gear 130, itself comprises a circumferential array of permanent magnet portions 140.

In the present embodiment, the sun gear 110 comprises eight (8) permanent magnet portions 140, and the corresponding region of the planet torque ring 122 comprises six (6) stator coil arrays 150. Likewise, each planet gear 120 comprises eight (8) permanent magnet portions 140, and the corresponding region of the planet torque ring 122 comprises six (6) stator coil arrays 150. In contrast, the ring gear 130 provides one hundred (100) permanent magnet portions 140, and the corresponding region of the planet torque ring 122 comprises thirty-two (32) stator coil arrays 150.

In the present embodiment, each circumferential array 142 of permanent magnet portions 140 is integrally formed with a respective one of the sun gear 110, the planet gears 120, and the ring gear 130. In other words, the circumferential array 142 of permanent magnet portions 140 is embedded in the body of the respective sun gear 110, planet gear 120, and ring gear 130.

As illustrated in FIG. 5, the planet torque ring 122 comprises a number of stator coil arrays 150. Each stator coil array 150 corresponds to a respective one of the arrays 142 of permanent magnets 140. There is a stator coil array 150 for each one of the sun gear 110, the planet gears 120, and the ring gear 130.

Each corresponding pair of stator coil array 150 and array 142 of permanent magnet portions 140 together forms an axial flux electric motor generator element 160. The axial clearance 124 between each ones of the corresponding pair of stator coil array 150 and array 142 of permanent magnet portions 140 may be varied to alter the electrical performance of the respective axial flux electric motor generator element 160.

In use, a rotary input 102 to the epicyclic geartrain 100 drives the sun gear 110. The sun gear 110 has a rotational motion 116. The sun gear 100 then drives each of the planet gears 120 with rotational motion 126. In the present arrangement, the ring gear 130 remains stationary.

Various example embodiments of the invention are described herein. Reference is made to these examples in a non-limiting sense. They are provided to illustrate more broadly applicable aspects of the invention. Various changes may be made to the invention described and equivalents may be substituted without departing from the scope of the invention. Further, it will be appreciated by those with skill in the art that each of the individual variations described and illustrated herein has discrete components and features which may be readily separated from or combined with the features of any of the other several embodiments without departing from the scope of the present inventions. All such modifications are intended to be within the scope of claims associated with this disclosure.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. An epicyclic geartrain comprising:
   a sun gear;
   a plurality of planet gears supported by a planet torque ring; and
   a ring gear, wherein:
   the planet gears meshingly surround the sun gear;
   the ring gear meshingly surrounds the planet gears;
   at least the sun gear is provided with a plurality of permanent magnet portions arranged as a circumferential array; and
   the planet torque ring is provided with at least one stator coil array, the or each stator coil array being positioned in axial alignment with the or each corresponding plurality of permanent magnet portions as an axial flux electric motor generator element.

2. The epicyclic geartrain as claimed in claim 1, wherein each of the plurality of planet gears is provided with a plurality of permanent magnet portions arranged as a circumferential array.

3. The epicyclic geartrain as claimed in claim 1, wherein each of the plurality of planet gears and the ring gear are provided with a plurality of permanent magnet portions arranged as a circumferential array.

4. The epicyclic geartrain as claimed in claim 1, wherein the plurality of magnet portions is arranged as a spaced circumferential array.

5. The epicyclic geartrain as claimed in claim 1, wherein each one of the plurality of magnet portions is attached to an axial face of a corresponding one of the sun gear, plurality of planet gears, and ring gear.

6. The epicyclic geartrain as claimed in claim 1, wherein each stator coil array comprises 'C' individual coil portions, each circumferential array of magnet portions comprises 'M' individual magnet portions, and a ratio of C/M is in the range of 0.2 to 1.0.

7. The epicyclic geartrain as claimed in claim 1, wherein:
   the sun gear comprises eight permanent magnet portions; and
   a stator coil array on a corresponding region of the planet torque ring comprises six coil portions.

8. The epicyclic geartrain as claimed in claim 1, wherein each planet gear comprises eight permanent magnet portions; and
   for each planet gear, a stator coil array on a corresponding region of the planet torque ring comprises six coil portions.

9. The epicyclic geartrain as claimed in claim 1, wherein the ring gear comprises one hundred permanent magnet portions; and
   a stator coil array on a corresponding region of the planet torque ring comprises thirty-two coil portions.

10. An epicyclic geartrain comprising:
    a sun gear;
    a plurality of planet gears supported by a planet torque ring; and
    a ring gear, wherein:
    the planet gears meshingly surround the sun gear;
    the ring gear meshingly surrounds the planet gears;

at least one of the sun gear, the plurality of planet gears, and the ring gear is provided with a plurality of permanent magnet portions arranged as a circumferential array;

the planet torque ring is provided with at least one stator coil array, the or each stator coil array being positioned in axial alignment with the or each corresponding plurality of permanent magnet portions as an axial flux electric motor generator element; and each stator coil array comprises at least six coil portions, the six coil portions being arranged as a circumferential array.

11. A geared turbofan engine comprising:

a fan;

a core gas turbine engine; and a gearbox, wherein the gearbox connects the fan to the core gas turbine engine, and the gearbox comprises an epicyclic geartrain comprising:

a sun gear;

a plurality of planet gears supported by a planet torque ring; and a ring gear, wherein:

the planet gears meshingly surround the sun gear;

the ring gear meshingly surrounds the planet gears;

at least one of the sun gear, the plurality of planet gears, and the ring gear is provided with a plurality of permanent magnet portions arranged as a circumferential array; and the planet torque ring is provided with at least one stator coil array, the or each stator coil array being positioned in axial alignment with the or each corresponding plurality of permanent magnet portions as an axial flux electric motor generator element.

* * * * *